United States Patent
Wolf

(10) Patent No.: US 6,782,996 B1
(45) Date of Patent: Aug. 31, 2004

(54) AXLE CARTRIDGE FOR CONVEYOR ROLLER

(75) Inventor: Stephen C. Wolf, Grand Rapids, MI (US)

(73) Assignee: Rapistan Systems Advertising Corp., Grand Rapids, MI (US)

(*) Notice: Subject to any disclaimer, the term of this patent is extended or adjusted under 35 U.S.C. 154(b) by 0 days.

(21) Appl. No.: 10/365,804

(22) Filed: Feb. 13, 2003

(51) Int. Cl.$^7$ .............................................. B65G 13/06
(52) U.S. Cl. ........................... 198/781.02; 798/781.03; 798/790; 193/37
(58) Field of Search ............... 198/780, 781.02–781.04, 198/789, 790, 281.08–281.1

(56) References Cited

U.S. PATENT DOCUMENTS

| | | | |
|---|---|---|---|
| 17,368 A | 5/1857 | Fisher .......................... 492/1 |
| 434,295 A | 8/1890 | Richardi ....................... 492/1 |
| 980,523 A | 1/1911 | Heimer | |
| 1,136,089 A | 4/1915 | Bernheim | |
| 1,726,720 A | 9/1929 | Schroyer .................... 646/184 |
| 1,752,020 A | 3/1930 | Mitchels ..................... 403/24 |
| 1,868,860 A | 7/1932 | Reis | |
| 1,919,495 A | 7/1933 | Allen | |
| 1,928,549 A | 9/1933 | Stuber ......................... 156/36 |
| 1,949,817 A | 3/1934 | Stonefield et al. ........... 308/20 |
| 1,971,995 A | 8/1934 | Stuber ......................... 156/36 |
| 2,024,024 A | 12/1935 | Carpenter ..................... 263/6 |
| 2,135,175 A | 11/1938 | Fallon ......................... 263/6 |
| 2,152,076 A | 3/1939 | Menough | |
| 2,622,720 A | 12/1952 | Lorig ......................... 198/787 |
| 2,696,283 A | 12/1954 | Barry ......................... 193/35 |
| 2,699,953 A | 1/1955 | Chaddick .................... 280/79.1 |
| 3,002,792 A | 10/1961 | Sekulski ..................... 308/20 |
| 3,258,097 A | 6/1966 | Wahl ........................... 193/37 |
| 3,353,644 A | 11/1967 | McNash et al. ............. 193/37 |
| 3,368,231 A | 2/1968 | Kravos et al. ............... 15/344 |

(List continued on next page.)

FOREIGN PATENT DOCUMENTS

| | | | |
|---|---|---|---|
| AT | 254043 | 5/1967 | |
| EP | 0061893 A2 | 10/1982 | ........... B65G/39/09 |
| FR | A070013 | 2/1959 | |
| FR | 2156855 | 6/1973 | ........... B65G/39/00 |
| FR | 2621021 | 3/1989 | ........... B65G/39/09 |
| JP | 403284749 | 12/1991 | ........... G03D/3/08 |
| JP | 8258948 | 8/1996 | ........... B65G/39/12 |
| WO | WO 9519309 | 7/1995 | ........... B65G/39/09 |

*Primary Examiner*—Joseph E. Valenza
(74) *Attorney, Agent, or Firm*—Van Dyke, Gardner, Linn & Burkhart, LLP

(57) ABSTRACT

A conveyor roller includes at least one axle cartridge and is mounted at opposite sidewalls of a conveyor. The axle cartridge includes a bearing assembly at an outer end and an inner support at an inner end. The bearing assembly provides rotational support of a roller portion about the axle portion, while the inner support is spaced from an inner end of the axle portion during normal use of the roller. The inner support may provide contact support at the inner axle portion in response to loading induced deflection of the roller, whereby the inner support limits flexing or bending of the roller portion and may limit binding of the bearing assembly during such loading conditions. The axle portion may include one or more guide members arranged along a generally tapered or conical-shaped axle end for guiding the axle portion into a correspondingly formed opening in the conveyor sidewall.

53 Claims, 4 Drawing Sheets

U.S. PATENT DOCUMENTS

| | | | |
|---|---|---|---|
| 3,402,802 A | 9/1968 | Lint | 193/37 |
| 3,599,769 A | 8/1971 | Gardella | 193/35 R |
| 3,610,387 A | 10/1971 | Vom Stein | 193/37 |
| 3,677,394 A | 7/1972 | Bloom | 198/127 |
| 3,713,521 A | 1/1973 | Moritake | 193/37 |
| 3,786,549 A | 1/1974 | Pott | 29/116 R |
| 3,793,689 A | 2/1974 | Specht | 29/116 R |
| 3,841,721 A | 10/1974 | Coutant et al. | 308/20 |
| 3,888,343 A | 6/1975 | Snyder | 198/127 R |
| 3,897,988 A | 8/1975 | Dickinson et al. | 308/189 R |
| 3,899,063 A | 8/1975 | Pollard | 193/35 A |
| 3,909,083 A | 9/1975 | Vahle | 308/20 |
| 3,934,951 A | 1/1976 | Stumpf | 308/20 |
| 3,936,170 A | 2/1976 | Shibano et al. | 355/3 R |
| 3,978,974 A | 9/1976 | Morrissey et al. | 198/782 |
| 3,980,172 A | 9/1976 | Degood | 198/781 |
| 4,029,200 A | 6/1977 | Dillon | 198/830 |
| 4,047,772 A | 9/1977 | Goloff | 308/237 R |
| 4,059,180 A | 11/1977 | Krivec et al. | 193/37 |
| 4,144,022 A | 3/1979 | Fusco | 432/246 |
| 4,148,386 A | 4/1979 | Bradbury | 193/37 |
| 4,196,805 A | 4/1980 | Banno | 198/827 |
| 4,213,523 A | 7/1980 | Frost et al. | 193/37 |
| 4,311,226 A | 1/1982 | Thompson et al. | 193/35 R |
| 4,326,619 A | 4/1982 | Garnett | 193/37 |
| 4,345,678 A | 8/1982 | Garnett | 193/35 R |
| 4,358,008 A | 11/1982 | Hillier | 193/37 |
| 4,392,177 A | 7/1983 | Geyken | 361/221 |
| 4,444,301 A | 4/1984 | Granberry | 193/35 R |
| 4,449,774 A | 5/1984 | Takashi et al. | 339/59 M |
| 4,484,372 A | 11/1984 | Patzold et al. | 15/42 |
| 4,577,747 A | 3/1986 | Martin | 198/500 |
| 4,606,659 A | 8/1986 | Hogan | 384/518 |
| 4,664,243 A | 5/1987 | Martin | 193/37 |
| 4,664,252 A | 5/1987 | Galbraith | 198/722 |
| 4,681,215 A | 7/1987 | Martin | 198/843 |
| 4,790,421 A | 12/1988 | Gorges | 193/37 |
| 4,852,230 A | 8/1989 | Yu | 29/148.4 D |
| 4,864,704 A | 9/1989 | Hogan et al. | 29/119 |
| 4,896,758 A | 1/1990 | Hoszowski | 193/37 |
| 4,978,266 A | 12/1990 | Becker et al. | 411/61 |
| 5,048,661 A | 9/1991 | Toye | 193/35 R |
| 5,088,596 A | 2/1992 | Agnoff | 198/788 |
| 5,261,528 A | 11/1993 | Bouchal | 198/842 |
| 5,380,104 A | 1/1995 | Garnett | 384/546 |
| 5,421,442 A | 6/1995 | Agnoff | 193/37 |
| 5,582,286 A | 12/1996 | Kalm et al. | 198/781.06 |
| 5,598,600 A | 2/1997 | Stegens | 15/179 |
| 5,645,155 A | 7/1997 | Houghton | 193/35 R |
| 5,657,853 A | 8/1997 | Pennino | 198/499 |
| 5,659,868 A | 8/1997 | Fromm et al. | 399/331 |
| 5,678,676 A | 10/1997 | Pierson | 193/37 |
| 5,857,554 A | 1/1999 | Toye | 193/35 R |
| 5,865,290 A | 2/1999 | Scott | 193/37 |
| 5,875,878 A | 3/1999 | Pierson | 193/37 |
| D413,420 S | 8/1999 | Nimmo et al. | D34/29 |
| 5,988,362 A | 11/1999 | Nakamura et al. | 198/831 |
| 6,016,900 A | 1/2000 | Longrod | 193/37 |
| 6,042,061 A | 3/2000 | Shimizu | 248/55 |
| 6,044,963 A | 4/2000 | Lerch et al. | 198/780 |
| 6,053,298 A | 4/2000 | Nimmo et al. | 193/37 |
| 6,059,095 A | 5/2000 | Tsuji | 198/780 |
| 6,076,647 A | 6/2000 | Agnoff | 193/37 |
| 6,113,059 A | 9/2000 | Couillard | 248/694 |
| 6,161,673 A | 12/2000 | Nimmo et al. | 193/37 |
| 6,164,439 A | 12/2000 | Stebnicki et al. | 198/853 |
| 6,305,529 B1 | 10/2001 | Scottie | 198/842 |
| 6,419,070 B1 | 7/2002 | Agnoff | 193/37 |
| 6,454,077 B2 | 9/2002 | Nimmo et al. | 193/37 |
| 6,471,043 B2 | 10/2002 | Schwingshandl et al. | 198/781.06 |
| 6,523,665 B2 | 2/2003 | Nimmo et al. | 193/35 R |
| 6,547,054 B2 | 4/2003 | Gamache | 193/37 |
| 6,554,117 B2 * | 4/2003 | Henson et al. | 193/37 |
| 2001/0002643 A1 | 6/2001 | Nimmo et al. | 193/37 |
| 2003/0015394 A1 | 1/2003 | Nimmo et al. | 193/37 |
| 2003/0047414 A1 | 3/2003 | Henson et al. | 193/35 R |

* cited by examiner

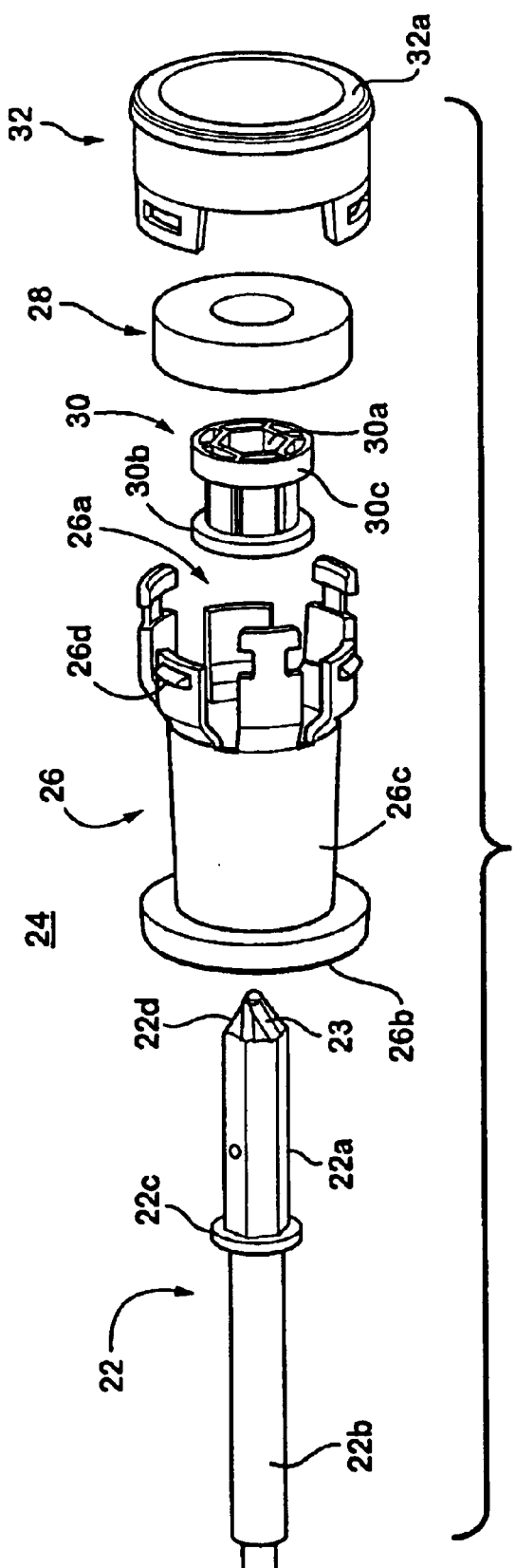
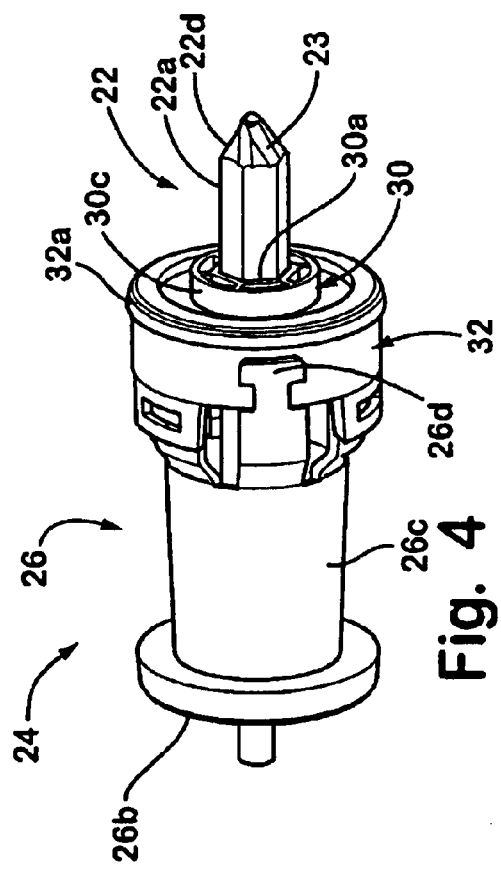
Fig. 5
Fig. 4

AXLE CARTRIDGE FOR CONVEYOR ROLLER

FIELD OF THE INVENTION

The present invention relates generally to conveyor rollers and, more particularly, to axle cartridges or stub axles or axle bearing units or inserts for conveyor rollers for rotatably mounting the ends or axles of a conveyor roller to the sidewalls of the conveyor.

BACKGROUND OF THE INVENTION

It is known in the roller conveyor art to mount rollers at and between the sidewalls of a conveyor frame. The rollers typically include an axle or opposite axle portions which extend into openings in the sidewalls. The rollers may have a generally cylindrical roller portion or tapered roller portion or crowned roller portion or the like which is rotatable relative to the axle or axle portions. It is also known to provide an axle bearing unit or cartridge or insert at one or both ends of a roller which provides for rotational movement of the roller portion about the respective stub axle or stub axles extending from the axle bearing unit or units. The stub axle may be spring-loaded or biased to facilitate retraction of the stub axle and to bias the stub axle to extend outwardly from the axle bearing unit for insertion into the openings in the sidewalls.

To ease insertion of the stub axle, which typically has a hexagonal-shaped cross section for insertion into a correspondingly formed hexagonally-shaped opening in the conveyor sidewall, it is known to provide a tapered end or tip at the outer end of the stub axle. The tapered end portion may also have a hexagonal-shaped cross section and may guide the stub axle into the opening and generally align the stub axle with the walls of the opening.

SUMMARY OF THE INVENTION

The present invention provides an axle bearing unit or cartridge for positioning at one or both ends of a roller portion. The axle bearing unit provides an axle portion or stub axle with guide members or ribs or ridges extending along a conical-shaped tip or end portion of the stub axle for aligning the stub axle shape or form with the correspondingly formed opening in the sidewall of the conveyor. The axle bearing unit also provides for rotational support of the roller portion about the stub axle via a bearing assembly at one end of the stub axle and further provides a support wall or member for limiting flexing or bending of the roller portion relative to the stub axle. The support member may be circumferentially spaced around the stub axle during normal operation and may contact a portion of the stub axle to limit further flexing or bending of the roller portion in response to loading of the roller portion of the conveyor roller.

According to an aspect of the present invention, an axle bearing unit or assembly or cartridge is configured to be received within an end of a roller tube or sleeve or portion of a conveyor roller. The axle bearing cartridge comprises a housing adapted to be inserted at least partially into an end of the roller portion, a stub axle or axle portion positioned partially within the housing, and a bearing assembly positioned generally at the outer end of the housing and between the stub axle and the housing to provide for rotational support of the housing about the stub axle. An inner end of the housing comprises an inner support or support member or wall. The stub axle has a longitudinal axis and extends at least partially through the inner support such that the inner support defines a gap circumferentially around the stub axle. The inner support of the housing may define the circumferential gap during operation of the roller conveyor, while a portion of the inner support may close the gap and provide contact support for the stub axle in response to loading induced deflection generally at the inner end of the housing in a direction generally normal to the longitudinal axis of the stub axle.

The inner support of the housing may define the circumferential gap during normal operation of the roller conveyor, while the portion of the inner support may close the gap in response to overloading of the roller portion of the roller, wherein the overloading may be greater than a threshold amount of loading of the roller portion.

In one form, the inner support defines an inner wall at the inner end of the housing. The inner wall defines an inner opening therethrough for receiving the stub axle at least partially therethrough. The inner opening has a diameter which is greater than a diameter of an inner axle portion of the stub axle, which may comprise a generally cylindrical inner axle portion.

In one form, an outer axle portion comprises a hexagonal-shaped cross section and a generally conical-shaped outer end. The conical-shaped outer end may comprise at least one raised rib therealong. The raised rib or ribs may be arranged on the conical-shaped outer end to be skewed or non-parallel to a plane bisecting the stub axle along the longitudinal axis of the stub axle. In other words, the raised rib or ribs may be arranged non-longitudinally along the generally conical surface of the generally conical-shaped outer end of the stub axle.

According to another aspect of the present invention, a conveyor roller for mounting at and between opposite sidewalls of a conveyor comprises a roller tube or sleeve or portion and an axle portion positioned at least partially within the roller portion and rotatable relative thereto. The axle portion defines a longitudinal axis and extends from at least one end of the roller portion. The axle portion has a generally tapered or conical-shaped outer axle end defining a generally tapered or conical-shaped surface. The outer axle end has at least one raised rib positioned along the generally conical-shaped surface of the axle end for aligning the axle portion with a respective correspondingly formed opening in a sidewall of the conveyor.

The rib or ribs may have a generally rounded cross section. The raised rib or ribs is/are arranged to be non-parallel or skewed relative to a plane bisecting the axle portion along the longitudinal axis of the axle portion. The raised ribs may comprise generally straight ribs extending along the conical-shaped surface and may define an angle between them, such as an angle of approximately 60 degrees or 120 degrees or other desired angle.

The axle portion may be axially movable relative to the roller portion between an extended position and a retracted position to ease mounting of the roller to the conveyor sidewalls. In one form, the axle portion is slidably mounted at an axle bearing unit positioned at least partially within the roller portion. The axle bearing unit may comprise a housing adapted to be inserted at least partially into the roller portion and comprising an inner support defining an opening at an inner end of the housing. The axle portion extends at least partially through the opening, wherein the opening defines a gap generally circumferentially around the axle portion. A portion of the support of the housing may close the gap and contact the axle portion in response to loading of the roller portion in a direction generally normal to a longitudinal axis of the axle portion.

Therefore, the present invention provides an axle bearing unit or assembly or cartridge which provides for rotational support of a roller portion of a roller about a stub axle or axle portion with a single bearing assembly, while limiting or substantially precluding flexing or bending of the roller and binding of the bearing assembly during excessive loading of the roller. The axle bearing unit thus provides enhanced rotation of the roller about the stub axle while substantially avoiding binding of or damage to the bearing assembly during such loading conditions. Also, the present invention provides an outer axle end of an axle portion which engages a respective opening in the sidewall of the conveyor and may cause rotation of the axle portion to align the form or shape of the axle portion with the corresponding form or shape of the opening. The outer axle end may include one or more alignment ribs or guides or members positioned along and protruding from a generally conical surface. The alignment members engage the conveyor sidewall around the respective opening and may cause rotation of the axle portion to align the axle portion with the opening as the outer axle end and axle portion are inserted into and at least partially through the opening in the conveyor sidewall.

These and other objects, advantages, purposes and features of the present invention will become apparent upon review of the following specification in conjunction with the drawings.

BRIEF DESCRIPTION OF THE DRAWINGS

FIG. 4 is a perspective view of an axle cartridge of the present invention;

FIG. 5 is an exploded perspective view of the axle cartridge of FIG. 4;

DESCRIPTION OF THE PREFERRED EMBODIMENTS

Figure 1:
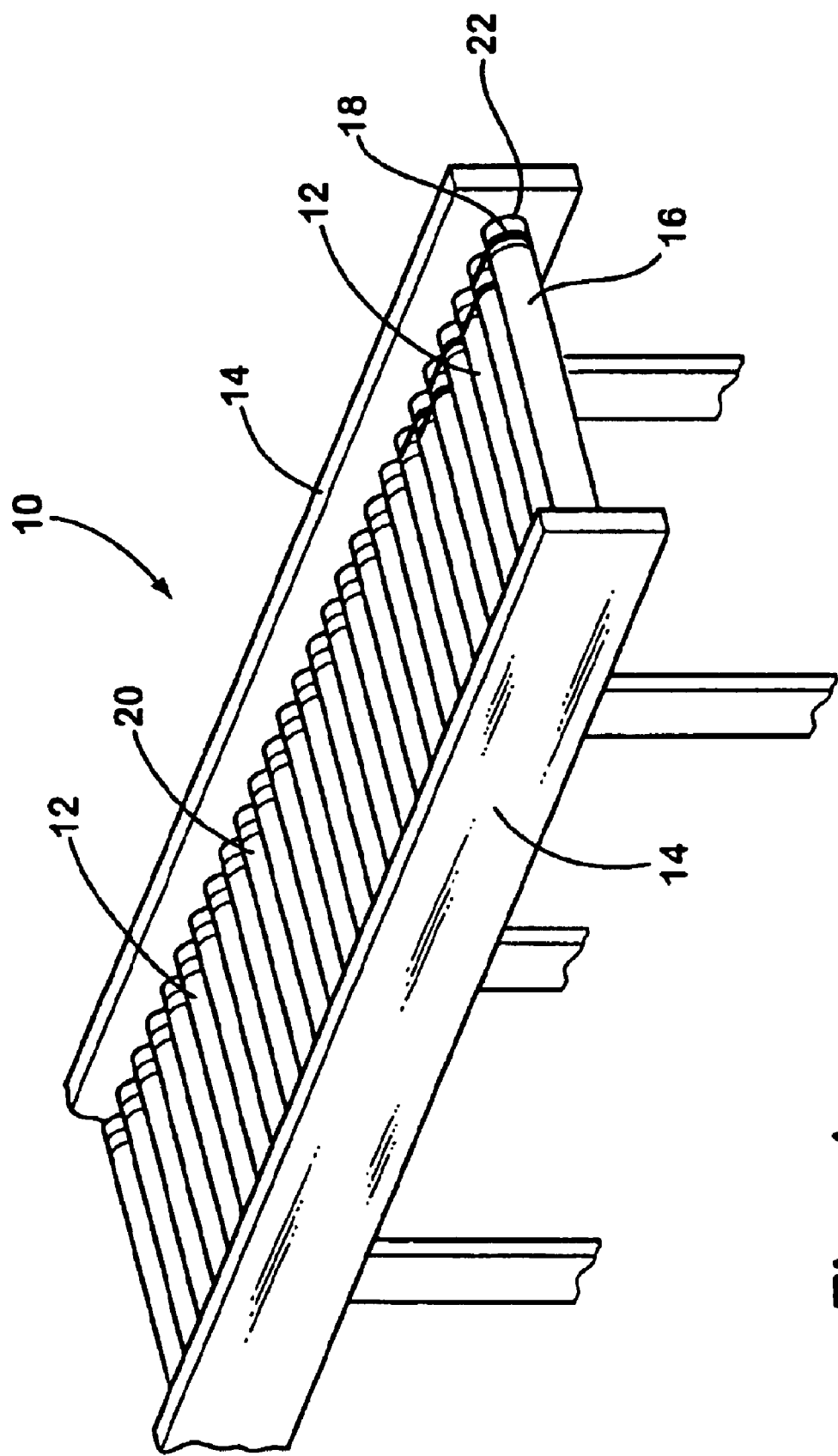
FIG. 1 is an upper perspective view of a conveyor having rollers which include an axle bearing unit or cartridge in accordance with the present invention.
Figure 2:
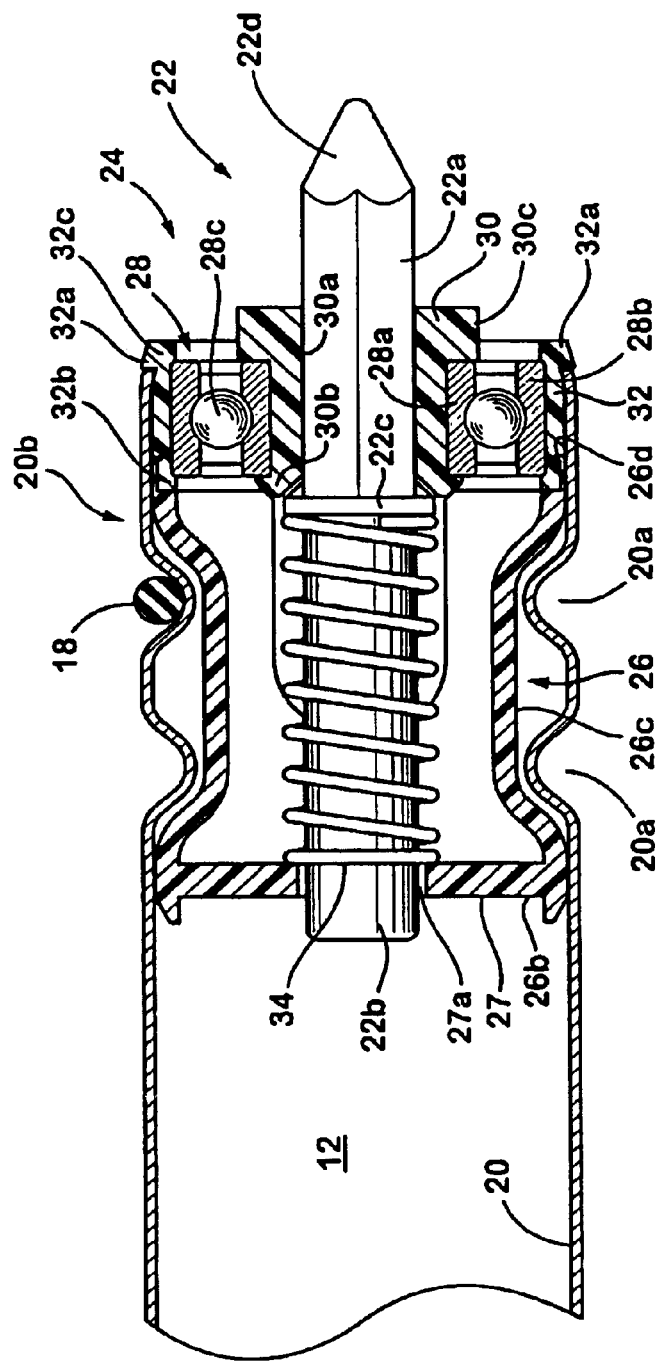
FIG. 2 is a sectional view of an end portion of one of the rollers and axle cartridges of the present invention.

Referring now specifically to the drawings and the illustrative embodiments depicted therein, a roller conveyor 10 comprises a plurality of idler rollers 12 rotatably mounted at opposite sidewalls 14 for conveying articles along conveyor 10 (FIG. 1). Rollers 12 are mountable to sidewalls 14 of conveyor 10 via at least one extendable and retractable stub axle or axle portion 22 extending from an axle bearing unit or stub axle unit or cartridge 24 at at least one end of the roller (FIG. 2). The idler rollers 12 include generally cylindrical roller portions 20 which generally freely rotate about the respective stub axles or axle portions 22 extending from opposite ends of the roller portions to convey articles along the roller conveyor. The stub axle 22 may include a generally conical-shaped outer end or tip 22d having one or more guide ribs or ridges 23 (FIGS. 6–11) to assist guiding and aligning the stub axle or axle portion with the corresponding opening in the sidewall of the conveyor during mounting of the roller to the conveyor, as discussed below.

The idler rollers 12 may be gravity operated or driven by any type of drive system or device, such as, for example, one or more motorized rollers 16 and O-rings 18, or other types of driven rollers, tape drive systems or the like, to rotate the roller portion 20 relative to the stub axle or axles 22 to convey articles along the conveyor, without affecting the scope of the present invention. The roller portion 20 may comprise a generally cylindrical sleeve or tube or may comprise a sleeve or tube having varying diameters therealong, such as a tapered tube or a crowned tube or the like, without affecting the scope of the present invention. As shown in FIG. 2, at least one end of the roller portion 20 receives the axle bearing unit or cartridge 24, whereby the stub axle 22 may extend longitudinally outwardly from the end of the roller portion for mounting the roller to the conveyor sidewall.

Stub axle 22 may be extendable and retractable from the respective stub axle unit 24 to facilitate mounting of the respective idler roller 12 to the sidewalls 14 of conveyor 10. Each stub axle 22 includes an outer axle portion 22a, an inner axle portion 22b and a shoulder or raised portion 22c. In the illustrated embodiments, outer axle portion 22a comprises a hexagonal-shaped portion, while inner axle portion 22b comprises a generally cylindrical portion. The hexagonal-shaped outer axle portion 22a may be formed to insert at least partially into and fit snugly within one of the correspondingly formed openings (not shown) in the conveyor sidewalls or within a mounting member or block or device (also not shown) positioned at the conveyor sidewall. However, the inner and/or outer axle portions may comprise other shapes, depending on the particular application of the stub axle units and rollers, and depending on the shape of the openings in the conveyor sidewalls or mounting member or device, without affecting the scope of the present invention.

Each stub axle unit 24 includes a sleeve or housing 26, a bearing assembly 28 and stub axle 22. As shown in FIG. 2, housing 26 of stub axle unit 24 is received within an end portion 20b of the outer roller portion or tube 20 of a roller, and may be press fit and frictionally retained within roller portion 20 or otherwise generally secured within the roller portion 20. Housing 26 may comprise a generally cylindrical and hollow housing having a generally open outer end 26a and an inner end 26b defining an inner support or support member 27, such as the wall or disc of the illustrated embodiment. The housing or shell 26 may be generally cylindrical and may have a narrowed or reduced diameter portion 26c for accommodating indentations or grooves 20a around roller portion 20 for receiving O-rings 18 or the like, as shown in FIG. 2, or may comprise a generally uniform cylindrical shape or any other shape or form that is receivable within the roller shell or tube, without affecting the scope of the present invention.

Outer end 26a of housing 26 may receive bearing assembly 28 therein or may comprise one or more snap or attachment members 26d for fastening or attaching to bearing assembly 28 or to an outer adapter 32. Outer adapter 32 may include a raised outer lip or ridge 32a (FIGS. 2, 4 and 5) for limiting insertion of housing 26 and outer adapter 32 into roller portion 20. Outer adapter 32 receives bearing assembly 28 within and between a pair of raised ridges 32b, 32c to limit axial movement of bearing assembly 28 relative to outer adapter 32.

As shown in FIGS. 2 and 4, bearing assembly 28 may comprise an outer race 28a, an inner race 28b and a plurality of balls 28c or the like to provide generally smooth and low friction rotation of outer race 28a about inner race 28b. Other forms of bearings or bearing assemblies may be implemented without affecting the scope of the present invention. Outer portion or race 28a of bearing assembly 28 may be substantially fixedly or non-rotatably secured or mounted to or integrally molded with outer adapter 32 at or near outer end 26a of housing 26, while inner portion or race 28b of bearing assembly 28 may also be substantially fixedly secured or mounted to or integrally molded with an inner adapter 30, so as to provide rotation of outer adapter 32 about inner adapter 30, and thus to provide rotation of housing 26 outer shell or tube or roller portion 20 around stub axle 22.

As best shown in FIGS. 2, 4 and 5, inner adapter 30 may comprise opposite raised ends 30b, 30c to substantially preclude longitudinal or axial movement of inner adapter 30 relative to bearing assembly 28 and housing 26. Inner adapter 30 defines a generally hexagonal-shaped passageway 30a for slidably receiving outer axle portion 22a therethrough, such that outer axle portion 22a of stub axle 22 is non-rotatable and axially or longitudinally slidable relative to inner adapter 30. Shoulder 22c of stub axle 22 may engage inner end 30b of inner adapter 30 to limit outward extension of stub axle 22 and outer axle portion 22a relative to inner adapter 30 and, thus, relative to housing 26 of axle bearing unit 24, as can be seen in FIG. 2. The opposite end or inner axle portion 22b of stub axle extends inward from shoulder 22c and from inner adapter 30 and extends at least partially through support 27 of inner end 26b of housing 26.

Support or support member or wall 27 at inner end 26b of housing 26 defines an opening or passageway 27a therethrough for at least partially receiving inner axle portion 22b, such that inner axle portion 22b extends at least partially through opening 27a in support 27. As can be seen in FIG. 2, opening 27a has a larger diameter than the diameter of the generally cylindrical inner axle portion 22b, such that support 27 defines a gap circumferentially around the generally cylindrical inner axle portion 22b. Housing 26 thus may rotate around and be supported at stub axle 22 via bearing assembly 28, whereby inner support 27 does not contact inner axle portion 22b during normal use of the idler roller 12. However, during excessive loading of the roller portion 20 at a location along the roller portion generally laterally inward of bearing assembly 28 of axle bearing unit 24, the roller portion 20 and housing 26 may flex or bend, whereby a portion of inner support 27 may close the gap and contact inner axle portion 22b. Inner support 27 thus may limit flexing or bending of the roller and/or binding of the bearing assembly 28 during such loading conditions.

Figure 3:
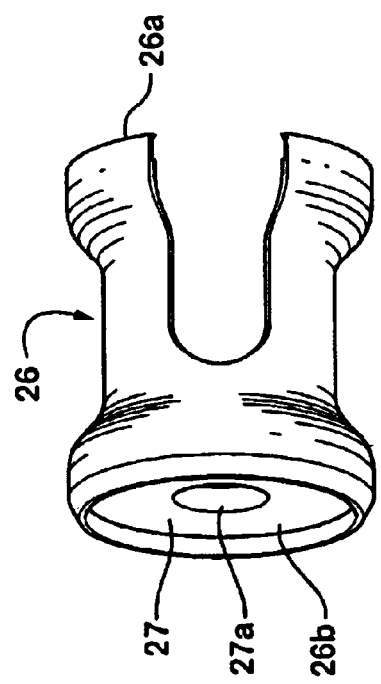
FIG. 3 is a perspective view of a housing portion of the axle cartridge of FIG. 2.

Stub axle 22 may be slidably or movably positioned within inner adapter 30 and is axially slidable between a retracted position and an extended position (shown in FIG. 2), where outer axle portion 22a extends outwardly from roller portion 20 for mounting stub axle 22 and roller 12 to the sidewalls 14 of the roller conveyor. Outer axle portion 22a may further include a conical-shaped tip or end 22d and one or more guide members 23 (FIGS. 4–8) to assist in guiding outer axle portion 22a into a respective hexagonal-shaped opening (not shown) in sidewall 14 of conveyor 10, as discussed below. Stub axle 22 may be biased toward the extended position, such as via a biasing member or spring 34 received or coiled around inner axle portion 22b and engaging shoulder 22c of stub axle 22 at one end and support or wall 27 of housing 26 at the other end, as shown in FIG. 2. Inner axle portion 22b extends at least partially through opening 27a in support 27 when stub axle 22 is in the extended position, while retraction or inward movement of stub axle 22 moves and inserts inner axle portion 22b further through opening 27a and compresses biasing member 34 while retracting outer axle portion 22a toward and at least partially into housing 26. In the illustrated embodiment, housing 26 comprises a slotted sidewall, such as shown in FIG. 3, to ease assembly of stub axle 22 and biasing member 34 within housing 26 of stub axle unit 24.

During mounting or installation of roller 12 to sidewalls 14, stub axle 22 may be pressed inward toward the retracted position to retract the outer axle portion 22a and outer tip 22d of stub axle 22 inward, whereby roller 12 may be positioned between the sidewalls of the conveyor. When stub axle 22 is released, biasing member 34 biases or urges stub axle 22 outward to the extended position. As stub axle 22 extends, outer end 22d of stub axle 22 inserts into the respective opening in the sidewall of the conveyor and may cause rotation of the stub axle to align the hexagonal-shaped outer axle portion with the correspondingly formed or shaped opening in the conveyor sidewall as the stub axle 22 extends and inserts further into the sidewall opening, as discussed in detail below.

When roller 12 is installed at the sidewalls 14 of conveyor 10, roller portion or sleeve 20 of roller 12 is freely rotatable about and supported at inner adapter 30 and stub axle 22 via bearing assembly 28. During normal operation and use of roller 12 and conveyor 10, the circumferential gap 27b around inner axle portion 22b at inner support 27 of housing 26 provides for non-contacting rotation of housing 26 about stub axle 22 at support 27, such that the rotational support of roller portion 20 around and at stub axle 22 is provided by bearing assembly 28. However, if excessive loading of roller 12 occurs, such as increased loading at the cylindrical portion 20 or inner end 26b of housing 26 in a direction generally normal to the longitudinal axis of the axle, roller portion 20 and/or housing 26 of axle bearing unit 24 may flex or bend such that a portion of support 27 contacts inner axle portion 22b and thus limits or substantially precludes further loading induced bending or flexing or deflection of housing 26 and roller portion 20. The inner support 27 thus may close the gap in response to overloading of the roller portion of the roller, wherein the overloading may be a load amount or force greater than a threshold amount of loading or force at the roller portion.

The inner support 27 thus may provide non-contacting free rotation during normal operation of the roller and roller conveyor, while also providing contact support of the roller during excessive loading conditions of the roller, such as may occur if someone steps on the roller, such as during maintenance of the conveyor or the like. The inner support 27 thus may provide direct support to the roller portion at an area inwardly from the bearing assembly 28 at the outer end of the roller, such that the inner support may transfer the load directly to the roller portion or tube, such as in a direction generally transverse or perpendicular to the longitudinal axis of the roller. The direct support may be provided by the inner support of the housing, which may engage an inner surface of the roller portion generally at the inner support. Such direct support substantially limits bending or flexing or binding of the roller during such overloading conditions.

Optionally, inner axle portion 22b and/or inner support 27 at opening 27a may comprise smooth, low coefficient of friction surfaces to provide rotational movement of support 27 about inner axle portion 22b even when contact is made therebetween. The support 27 thus may provide rotational support of the roller portion about the stub axle even during high loading conditions, and may limit or substantially preclude further bending or flexing of the roller and, thus, may limit or substantially preclude binding of the bearing assembly 28 during such loading conditions.

Figure 6:
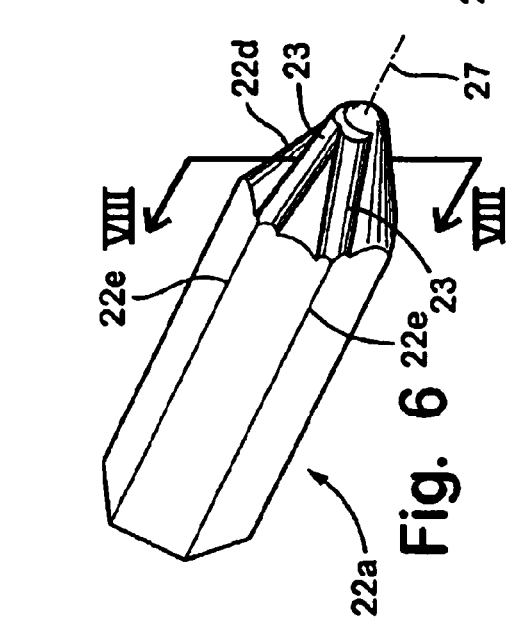
FIG. 6 is a perspective view of an end of an axle portion in accordance with the present invention.
Figure 7:
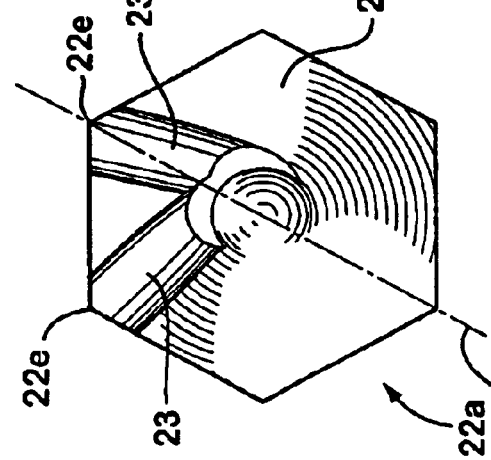
FIG. 7 is an end view of the axle portion of FIG. 6.
Figure 8:
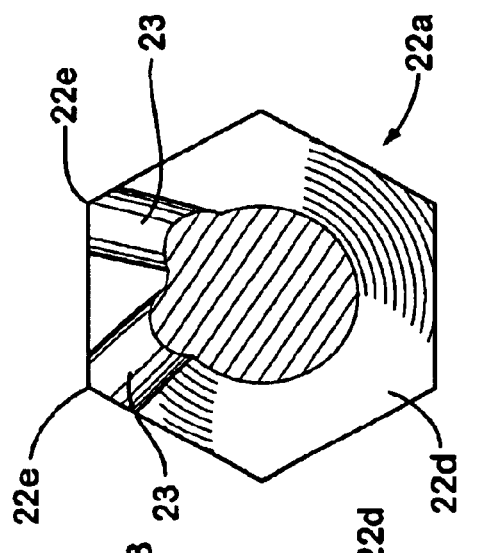
FIG. 8 is a sectional view taken along the line VIII—VIII in FIG. 6.

Referring now to FIGS. 6–8, outer end or tip 22d of outer axle portion 22a may comprise a generally tapered or conical-shaped tip or end and preferably includes at least one guiding or aligning rib or ridge or member 23 extending along and protruding from the conical or rounded surface of the end 22d. Guide members 23 may comprise generally straight ribs or ridges extending along the generally tapered or conical-shaped surface of end 22d of outer axle portion 22a and function to engage the walls of the opening in the sidewall of the conveyor, particularly at the corners of a hexagonal-shaped opening or the like, and to twist or rotate the axle portion as the axle end is inserted into the opening, so as to align the generally hexagonal-shaped axle portion with the correspondingly shaped or formed opening in the sidewall of the conveyor.

As shown in FIGS. 6 and 7, the conical-shaped end 22d may narrow to a generally rounded tip or point, with the aligning members 23 extending along the conical surface generally between the tip or end of the axle and a point or corner 22e of the hexagonal-shaped outer axle portion 22a of stub axle 22. Alignment members 23 may be skewed or not aligned with the longitudinal axis of the axle or axle portion, as can be seen with reference to FIGS. 6 and 7. In other words, the alignment members 23 may not be along or within a plane bisecting the axle portion along the longitudinal axis of the axle portion, such as a plane 25 (FIG. 7) bisecting the axle portion along the longitudinal axis 27 (FIG. 6) and extending between opposite corners 22e of the hexagonal-shaped (or other shape, depending on the application) axle portion. The alignment members 23 thus may engage the walls of the opening in the conveyor sidewall and may cause rotation of the axle portion to align with the respective opening in the sidewall as the axle tip is inserted into and at least partially through the opening in the conveyor sidewall. The alignment members 23 may be generally rounded, as best shown in FIGS. 7 and 8, to limit or substantially preclude binding of the axle tip as it is inserted into and aligned within the opening in the conveyor sidewall. As can be seen with reference to FIG. 8, the axle end thus may have a generally circular cross-section with one or more spaced apart and raised and rounded projections or ribs extending along the surface of the axle end or tip.

Figure 9:
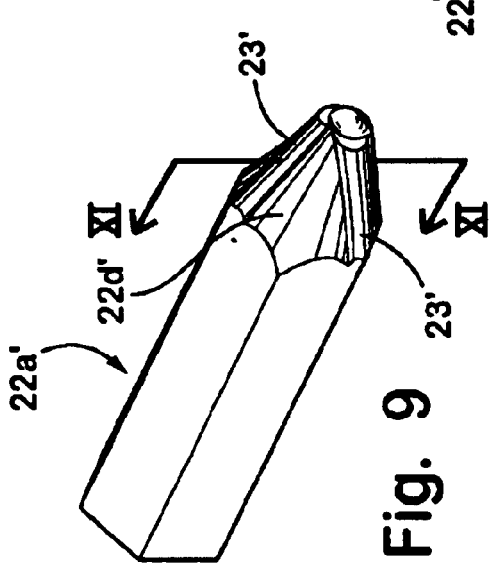
FIG. 9 is a perspective view of an end of another axle portion in accordance with the present invention.
Figure 10:
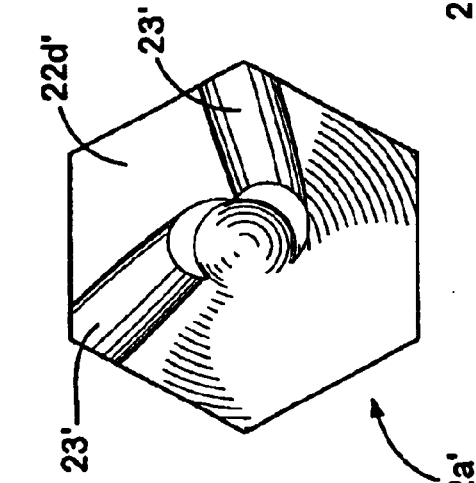
FIG. 10 is an end view of the axle portion of FIG. 9.
Figure 11:
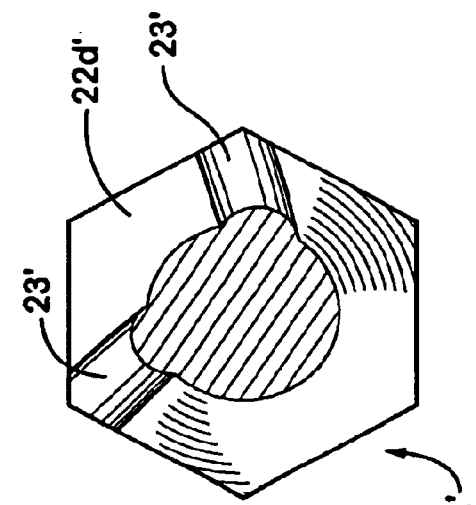
FIG. 11 is a sectional view taken along the line XI—XI in FIG. 9.

In the illustrated embodiment of FIGS. 6–8, two alignment members 23 are arranged along the surface of the tip and are positioned at an angle relative to one another of approximately 60 degrees, such that the ribs or members extend to adjacent corners or points 22e of the hexagonal-shaped or formed outer axle portion. Optionally, other arrangements of one or more alignment members may be implemented along an outer end or tip of an axle portion, such as a pair of alignment members 23' positioned or formed along an outer tip or end 22d' of an outer axle portion 22a' and arranged at an angle relative to one another of approximately 120 degrees, as shown in FIGS. 9–11, or other arrangements, without affecting the scope of the present invention.

The axle tip and alignment ridges or ribs or members thus function to engage the walls, and particularly the corners of the walls, of the respective opening in the conveyor sidewall and to rotate the axle portion to guide the points or corners of the hexagonal outer axle portion into alignment with the corresponding corners of the opening in the conveyor sidewall. The rotation and alignment of the stub axle or axle portion may occur as the stub axle is extended or urged outward from the axle bearing unit via the biasing member. Because the guide or alignment ribs or members may be rounded, the ribs may smoothly slide into and along the walls of the openings without binding in the corners or against the flat walls of the opening. Although shown and described as being implemented along an outer end or tip of a stub axle for the axle cartridge or unit 24, the conical-shaped end or tip and alignment members or ribs of the present invention may be implemented at the outer end of stub axles or the like of other axle cartridges or units or at the outer end of other types of axles or axle portions, without affecting the scope of the present invention.

Although aspects of the present invention are shown and described above with respect to particular embodiments, it is envisioned that the various aspects described herein may be used alone or in combination with other aspects of the present invention on various roller embodiments, without affecting the scope of the present invention.

Therefore, the axle bearing unit or assembly of the present invention provides for rotational support of the roller portion of a conveyor roller about the stub axle or axle portion via a single bearing assembly, while limiting or substantially precluding flexing or bending of the roller and/or binding of the bearing assembly during loading of the roller above a normal or threshold amount. The support or wall of the housing of the axle bearing unit may engage the stub axle to limit bending or flexing of the roller portion and/or housing during such loading conditions. The axle bearing unit thus provides enhanced rotational support of the roller while substantially avoiding binding of or damage to the bearing assembly during excessive loading conditions.

Also, the present invention provides an axle end or tip of an axle or axle portion of a conveyor roller which engages a respective opening in a sidewall of the conveyor or in a mounting member or device at a sidewall of the conveyor. The axle end or tip may cause rotation of the axle or axle portion to align the shape or form of the axle or axle portion with the corresponding shape or form of the opening. The axle end includes one or more alignment ribs or guides or members positioned along and protruding from a generally conical surface of the axle end or tip. The alignment members engage the walls of the conveyor sidewall or mounting device around the respective opening and may cause rotation of the axle or axle portion to align the axle shape or form with the shape or form of the opening as the axle end is inserted into and at least partially through the opening in the conveyor sidewall or mounting device.

Changes and modifications in the specifically described embodiments can be carried out without departing from the principles of the present invention, which is intended to be limited only by the scope of the appended claims, as interpreted according to the principles of patent law.

The embodiments of the invention in which an exclusive property or privilege is claimed are defined as follows:

1. An axle bearing cartridge configured to be received within an end of a roller portion of a conveyor roller, said axle bearing cartridge comprising:

a housing adapted to be inserted at least partially into an end of the cylindrical roller portion, said housing comprising an inner end and an outer end, said inner end comprising an inner support;

a stub axle positioned partially within said housing, said stub axle having a longitudinal axis, said stub axle extending at least partially through said inner support such that said inner support defines a gap circumferentially around said stub axle; and a bearing assembly positioned generally at said outer end of said housing and between said stub axle and said housing to provide rotational support of said housing about said stub axle, wherein a portion of said inner support of said housing closes said gap and provides contact support for said stub axle in response to loading induced deflection at said roller portion in a direction generally normal to said longitudinal axis of said stub axle.

2. The axle bearing cartridge of claim 1, wherein said inner support of said housing defines said circumferential gap during operation of the roller conveyor.

3. The axle bearing cartridge of claim 1, wherein said portion of said inner support closes a portion of said circumferential gap in response to loading induced deflection induced by overloading of said roller portion of the roller, said overloading being greater than a threshold amount of loading of said roller portion.

4. The axle bearing cartridge of claim 1, wherein said inner support defines an inner wall at said inner end of said housing, said inner wall defining an inner opening therethrough for receiving said stub axle at least partially therethrough.

5. The axle bearing cartridge of claim 1, wherein said inner support defines an inner opening for receiving an inner axle portion of said stub axle at least partially therethrough.

6. The axle bearing cartridge of claim 5, wherein said inner axle portion comprises a generally cylindrical inner axle portion, said inner opening having a diameter which is greater than a diameter of said inner axle portion.

7. The axle bearing cartridge of claim 1 including a biasing member for biasing said stub axle such that an outer axle portion of said stub axle extends outwardly from said housing.

8. The axle bearing cartridge of claim 7, wherein said biasing member comprises a coil spring generally wrapped around said stub axle.

9. The axle bearing cartridge of claim 7, wherein one end of said biasing member engages a raised portion of said stub axle and the other end of said biasing member engages said inner support.

10. The axle bearing cartridge of claim 1 including an inner adapter positioned around said axle and an outer adapter at said outer end of said housing, said bearing assembly being positioned between said inner adapter and said outer adapter to provide rotational support of said outer adapter, said housing and said roller portion around said inner adapter and said stub axle.

11. The axle bearing cartridge of claim 10, wherein said stub axle comprises a raised shoulder which engages said inner adapter to limit longitudinal outward movement of said stub axle relative to said inner adapter.

12. The axle bearing cartridge of claim 1, wherein said stub axle comprises an outer axle portion having a hexagonal-shaped cross section and a generally conical-shaped outer end.

13. The axle bearing cartridge of claim 12, wherein said conical-shaped outer end comprises at least one raised rib therealong.

14. The axle bearing cartridge of claim 13, wherein said at least one raised rib is arranged to be skewed relative to a plane bisecting said stub axle along said longitudinal axis of said stub axle and between opposite corners of said hexagonal-shaped outer axle portion.

15. The axle bearing cartridge of claim 13, wherein said conical-shaped outer end comprises a pair of raised ribs therealong.

16. The axle bearing cartridge of claim 15, wherein said pair of raised ribs comprise generally straight ribs extending along a surface of said conical-shaped outer end.

17. The axle bearing cartridge of claim 15, wherein each of said pair of raised ribs is arranged to be skewed relative to a plane bisecting said stub axle along said longitudinal axis of said stub axle and between opposite corners of said hexagonal-shaped outer axle portion.

18. The axle bearing cartridge of claim 17, wherein said pair of raised ribs are arranged to be non-parallel to one another.

19. The axle bearing cartridge of claim 18, wherein said pair of raised ribs are arranged to define an angle between them, said angle being approximately 60 degrees.

20. The axle bearing cartridge of claim 18, wherein said pair of raised ribs are arranged to define an angle between them, said angle being approximately 120 degrees.

21. A conveyor roller for mounting at and between opposite sidewalls of a conveyor, said conveyor roller comprising:

a roller portion; and an axle portion positioned at least partially within said roller portion and rotatable relative thereto, said axle portion defining a longitudinal axis and extending from at least one end of said roller portion, said axle portion having a generally conical-shaped axle end defining a generally conical-shaped surface, said axle end having at least one raised rib positioned along said generally conical-shaped surface of said axle end.

22. The conveyor roller of claim 21, wherein said at least one raised rib is arranged to be skewed relative to a plane bisecting said axle portion along said longitudinal axis.

23. The conveyor roller of claim 21, wherein said axle portion has a hexagonal-shaped cross-section, said at least on raised rib extending from a tip region of said conical-shaped axle and toward a corner of said hexagonal-shaped axle portion.

24. The conveyor roller of claim 23, wherein said at least one raised rib is arranged to be skewed relative to a plane bisecting said axle portion along said longitudinal axis of said axle portion and between opposite corners of said hexagonal-shaped axle portion.

25. The conveyor roller of claim 21, wherein said at least one raised rib comprises a generally straight rib extending along said conical-shaped surface.

26. The conveyor roller of claim 21, wherein said at least one raised rib comprises a pair of raised ribs positioned along said generally conical-shaped surface.

27. The conveyor roller of claim 26, wherein said pair of raised ribs are arranged to be skewed relative to a plane bisecting said axle portion along said longitudinal axis.

28. The conveyor roller of claim 26, wherein said pair of raised ribs are arranged to define an angle between them.

29. The conveyor roller of claim 28, wherein said angle is approximately 60 degrees.

30. The conveyor roller of cl aim 28, wherein said angle is approximately 120 degrees.

31. The conveyor roller of claim 21, wherein said at least one rib comprises a generally rounded cross section.

32. The conveyor roller of claim 21, wherein said axle portion is axially movable relative to said cylindrical roller portion.

33. The conveyor roller of claim 32, wherein said axle portion is movably mounted at an axle bearing unit positioned within said roller portion.

34. The conveyor roller of claim 33, wherein said axle bearing unit comprises a housing adapted to be inserted at least partially into said roller portion, said housing comprising an inner support at an inner end portion of said housing, said axle portion extending at least partially through said inner support, said inner support defining a gap circumferentially around said axle portion.

35. The conveyor roller of claim 34 including a bearing positioned generally at an outer end of said housing a nd between said axle portion and said housing to provide rotational support of said housing about said axle portion.

36. The conveyor roller of claim 35, wherein a portion of said inner support closes a portion of said circumferential gap and provides contact support of said axle portion in response to loading induced deflection at said inner end of said housing in a direction generally normal to said longitudinal axis of said axle portion.

37. The conveyor roller of claim 36, wherein said inner support defines an inner opening for receiving an inner axle portion at least partially therethrough, said inner opening having a diameter which is greater than a diameter of said inner axle portion.

38. A conveyor roller for mounting at and between opposite sidewalls of a conveyor, said conveyor roller comprising:

a roller portion; and an axle portion positioned at an end of said roller portion and rotatable relative thereto, said axle portion extending from at least one end of said roller portion, said axle portion having a generally tapered axle end defining a generally tapered surface, said axle end having at least one raised rib positioned along said generally tapered surface of said axle end, said at least one raised rib having a generally rounded cross section.

39. The conveyor roller of claim 38, wherein said a t least one raised rib is arranged to be skewed relative to a plane bisecting said axle portion along a longitudinal axis of said axle portion.

40. The conveyor roller of claim 38, wherein said axle portion has a hexagonal-shaped cross-section, said at least on raised rib extending from a tip region of said tapered axle end and toward a corner of said hexagonal-shaped axle portion.

41. The conveyor roller of claim 40, wherein said at least one raised rib is arranged to be skewed relative to a plane bisecting said axle portion along said longitudinal axis of said axle portion and between opposite corners of said hexagonal-shaped axle portion.

42. The conveyor roller of claim 38, wherein said at least one raised rib comprises a generally straight rib extending along said generally tapered surface.

43. The conveyor roller of claim 38, wherein said axle end comprises a pair of raised ribs positioned along said generally tapered surface.

44. The conveyor roller of claim 43, wherein said pair of raised ribs comprise generally straight ribs extending along said tapered surface.

45. The conveyor roller of claim 43, wherein said pair of raised ribs are arranged to be skewed relative to a plane bisecting said axle portion along a longitudinal axis of said axle portion.

46. The conveyor roller of claim 43, wherein said pair of raised ribs are arranged to define an angle between them.

47. The conveyor roller of claim 46, wherein said angle is approximately 60 degrees.

48. The conveyor roller of claim 46, wherein said angle is approximately 120 degrees.

49. The conveyor roller of claim 38, wherein said axle portion is axially movable relative to said roller portion.

50. The conveyor roller of claim 49, wherein said axle portion is movably mounted at an axle bearing unit positioned within said roller portion.

51. The conveyor roller of claim 50, wherein said axle bearing unit comprises a housing adapted to be inserted at least partially into said roller portion, said housing comprising an inner support at an inner end portion of said housing, said axle portion extending at least partially through said inner support, said inner support defining a gap circumferentially around said axle portion.

52. The conveyor roller of claim 51, wherein a portion of said inner support closes said gap and provides contact support of said axle portion in response to loading induced deflection at said inner end portion of said housing in a direction generally normal to a longitudinal axis of said axle portion.

53. The conveyor roller of claim 38, wherein said generally tapered end comprises a generally conical-shaped end and said generally tapered surface comprises a generally conical-shaped surface.

* * * * *